(12) United States Patent
Nozawa et al.

(10) Patent No.: US 10,360,660 B2
(45) Date of Patent: Jul. 23, 2019

(54) IMAGE PROCESSING APPARATUS AND IMAGE PROCESSING METHOD FOR HANDLING RAW IMAGES

(71) Applicant: CANON KABUSHIKI KAISHA, Tokyo (JP)

(72) Inventors: Shingo Nozawa, Tokyo (JP); Masamichi Ito, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 15/510,188

(22) PCT Filed: Aug. 20, 2015

(86) PCT No.: PCT/JP2015/004172
§ 371 (c)(1),
(2) Date: Mar. 9, 2017

(87) PCT Pub. No.: WO2016/038808
PCT Pub. Date: Mar. 17, 2016

(65) Prior Publication Data
US 2017/0256032 A1 Sep. 7, 2017

(30) Foreign Application Priority Data

Sep. 12, 2014 (JP) ................ 2014-186871
Sep. 12, 2014 (JP) ................ 2014-186872
Sep. 12, 2014 (JP) ................ 2014-186873

(51) Int. Cl.
*G06T 3/40* (2006.01)
*H04N 5/77* (2006.01)
(Continued)

(52) U.S. Cl.
CPC ........... *G06T 3/4015* (2013.01); *H04N 5/225* (2013.01); *H04N 5/23219* (2013.01);
(Continued)

(58) Field of Classification Search
CPC ........ G06T 3/4015; H04N 19/44; H04N 9/87; H04N 5/23245; H04N 5/23293;
(Continued)

(56) References Cited

U.S. PATENT DOCUMENTS 6,278,447 B1   8/2001  Anderson
7,903,871 B2   3/2011  Kaplinsky et al.
(Continued)

FOREIGN PATENT DOCUMENTS

CN   102883167 A   1/2013
CN   102959956 A   3/2013
(Continued)

*Primary Examiner* — Jason A Flohre
(74) *Attorney, Agent, or Firm* — Canon U.S.A., Inc. IP Division

(57) ABSTRACT

An image processing apparatus that handles RAW images favorably performs display when shooting and display when reproducing. The apparatus images a subject and generates RAW images, and reduces the RAW images and generates reduced RAW images. The RAW images and reduced RAW images are recorded in a recording medium. When shooting, the reduced RAW images are subjected to developing processing for display, and when reproducing, the reduced raw images recorded in the recording medium are acquired and subjected to developing processing in accordance with instructions to reproduce, and each is used for display.

13 Claims, 11 Drawing Sheets

(51) Int. Cl.
  *H04N 5/91* (2006.01)
  *H04N 9/82* (2006.01)
  *H04N 9/87* (2006.01)
  *H04N 19/44* (2014.01)
  *H04N 5/225* (2006.01)
  *H04N 5/232* (2006.01)
  *H04N 9/804* (2006.01)

(52) U.S. Cl.
  CPC ..... *H04N 5/23229* (2013.01); *H04N 5/23245* (2013.01); *H04N 5/23293* (2013.01); *H04N 5/772* (2013.01); *H04N 5/91* (2013.01); *H04N 9/8042* (2013.01); *H04N 9/8205* (2013.01); *H04N 9/8227* (2013.01); *H04N 9/87* (2013.01); *H04N 19/44* (2014.11)

(58) Field of Classification Search
  CPC ...... H04N 5/772; H04N 5/91; H04N 5/23229; H04N 5/23219; H04N 9/8205; H04N 9/8042; H04N 9/8227; H04N 5/225
  See application file for complete search history.

(56) References Cited

U.S. PATENT DOCUMENTS

| | | | |
|---|---|---|---|
| 2004/0056973 A1 | 3/2004 | Takaiwa et al. | |
| 2006/0221199 A1* | 10/2006 | Nakajima | H04N 5/232 348/222.1 |
| 2008/0018743 A1 | 1/2008 | Oh et al. | |
| 2009/0060447 A1* | 3/2009 | Nakao | H04N 5/232 386/354 |
| 2009/0135265 A1* | 5/2009 | Kawamura | H04N 5/232 348/220.1 |
| 2010/0026839 A1 | 2/2010 | Border et al. | |
| 2010/0061707 A1* | 3/2010 | Kosakai | H04N 5/232 386/241 |
| 2010/0277508 A1 | 11/2010 | Takahashi | |
| 2011/0052095 A1 | 3/2011 | Deever | |
| 2012/0044399 A1* | 2/2012 | Hirai | H04N 5/23245 348/333.01 |
| 2012/0308156 A1* | 12/2012 | Yamazaki | H04N 5/243 382/284 |
| 2014/0125821 A1* | 5/2014 | Kawa | H04N 5/23235 348/207.1 |
| 2014/0152871 A1* | 6/2014 | Campbell | H04N 19/423 348/231.99 |
| 2015/0271355 A1* | 9/2015 | Matsumoto | H04N 1/2112 348/231.2 |
| 2017/0201749 A1* | 7/2017 | Oishi | H04N 19/117 |

FOREIGN PATENT DOCUMENTS

| | | |
|---|---|---|
| JP | 2006101389 A | 4/2006 |
| JP | 2006-295815 A | 10/2006 |
| JP | 2008-283289 A | 11/2008 |
| JP | 2009-44256 A | 2/2009 |
| JP | 2010-81048 A | 4/2010 |
| JP | 2011-244423 A | 12/2011 |
| JP | 2014-49882 A | 3/2014 |
| JP | 2014103543 A | 6/2014 |
| RU | 2400815 C2 | 9/2010 |
| RU | 2512130 C2 | 4/2014 |
| WO | 2014/141637 A1 | 9/2014 |

* cited by examiner

[Fig. 1]
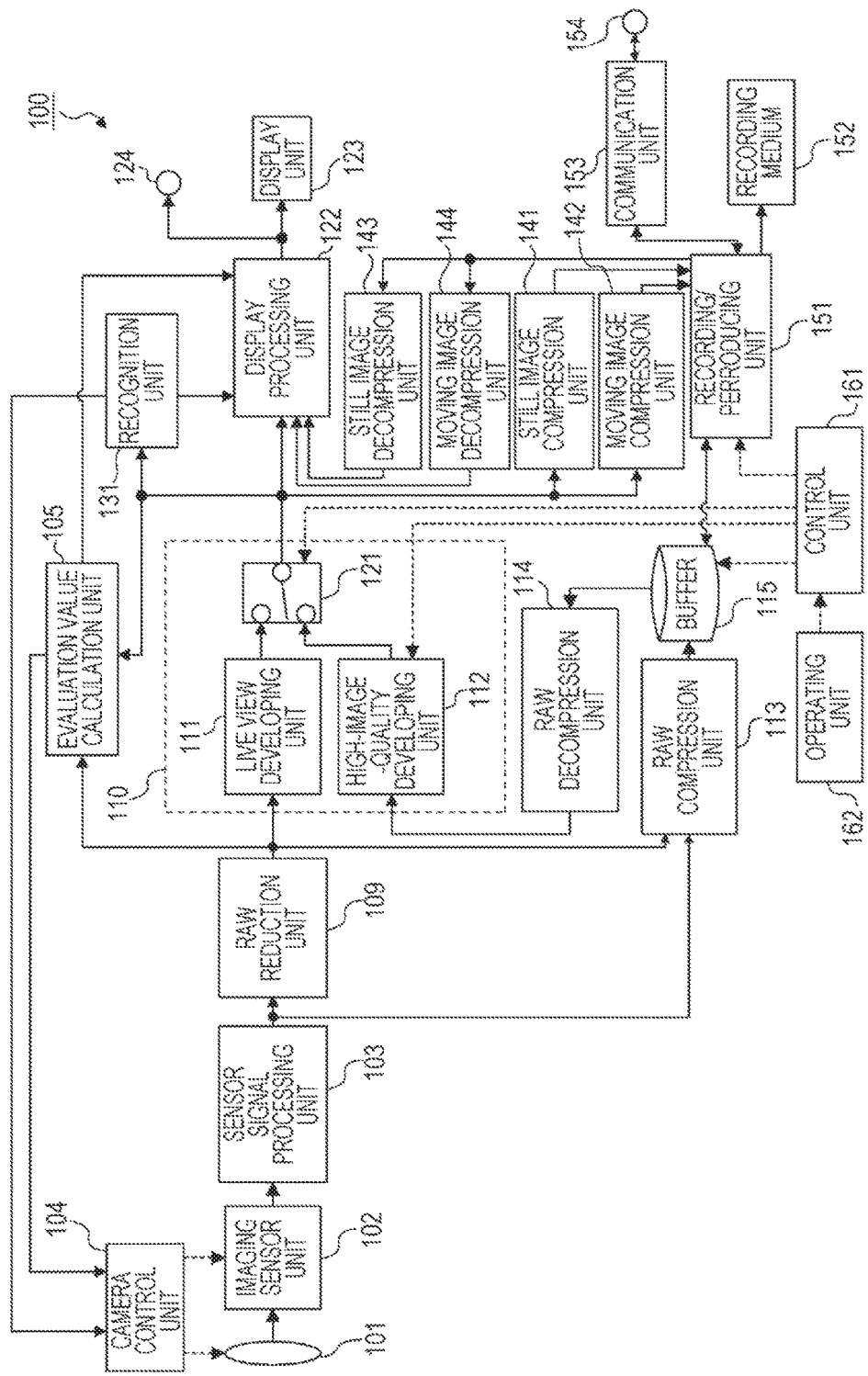

[Fig. 2]
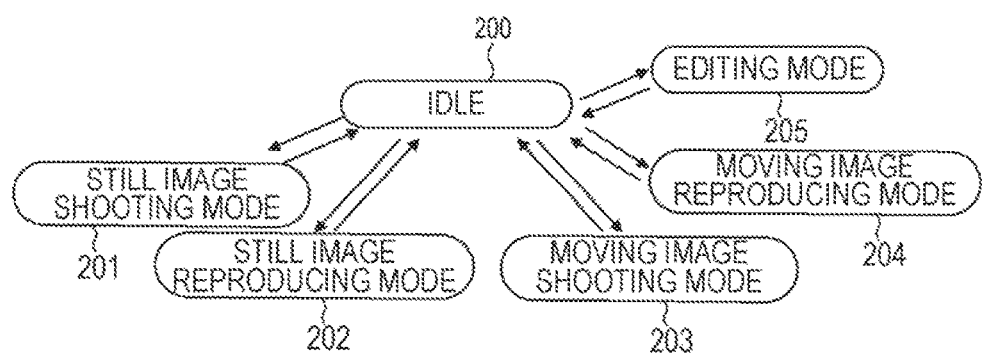

[Fig. 3]
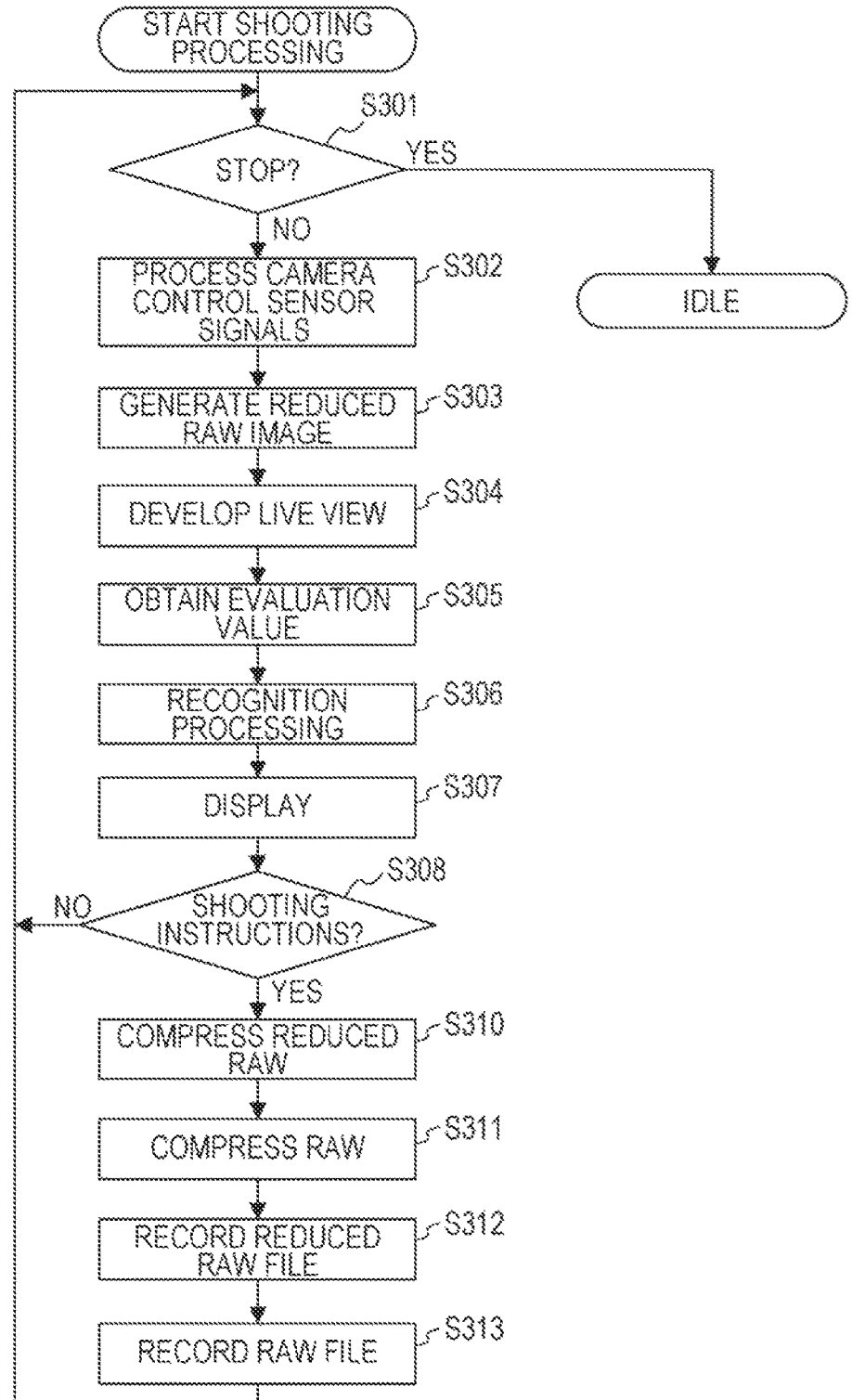

[Fig. 4A]
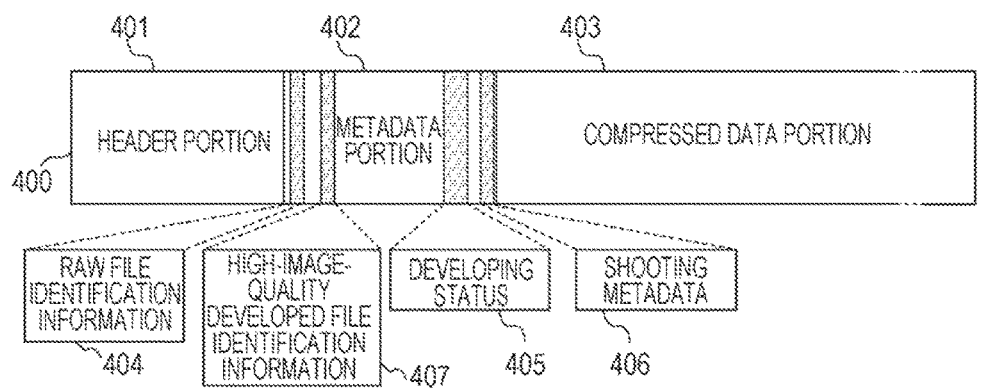
[Fig. 4B]
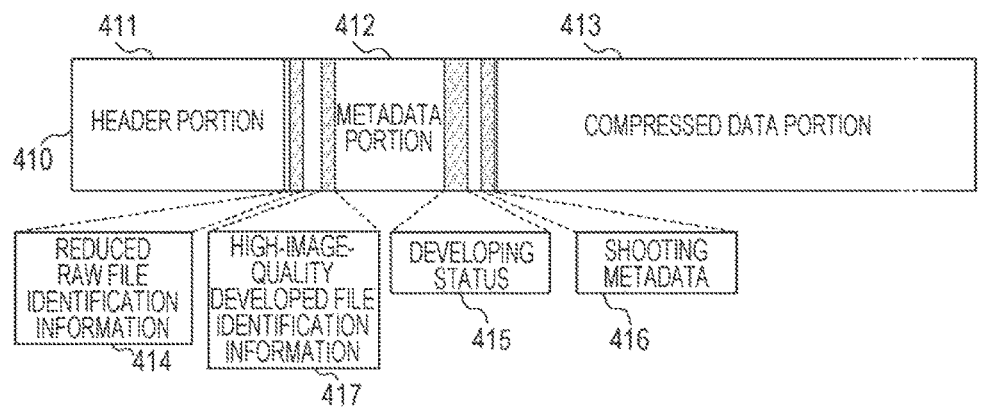
[Fig. 4C]
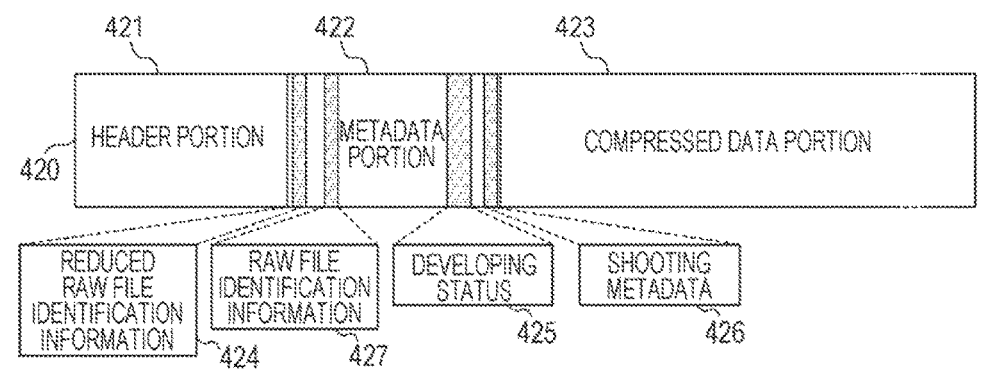

[Fig. 5]
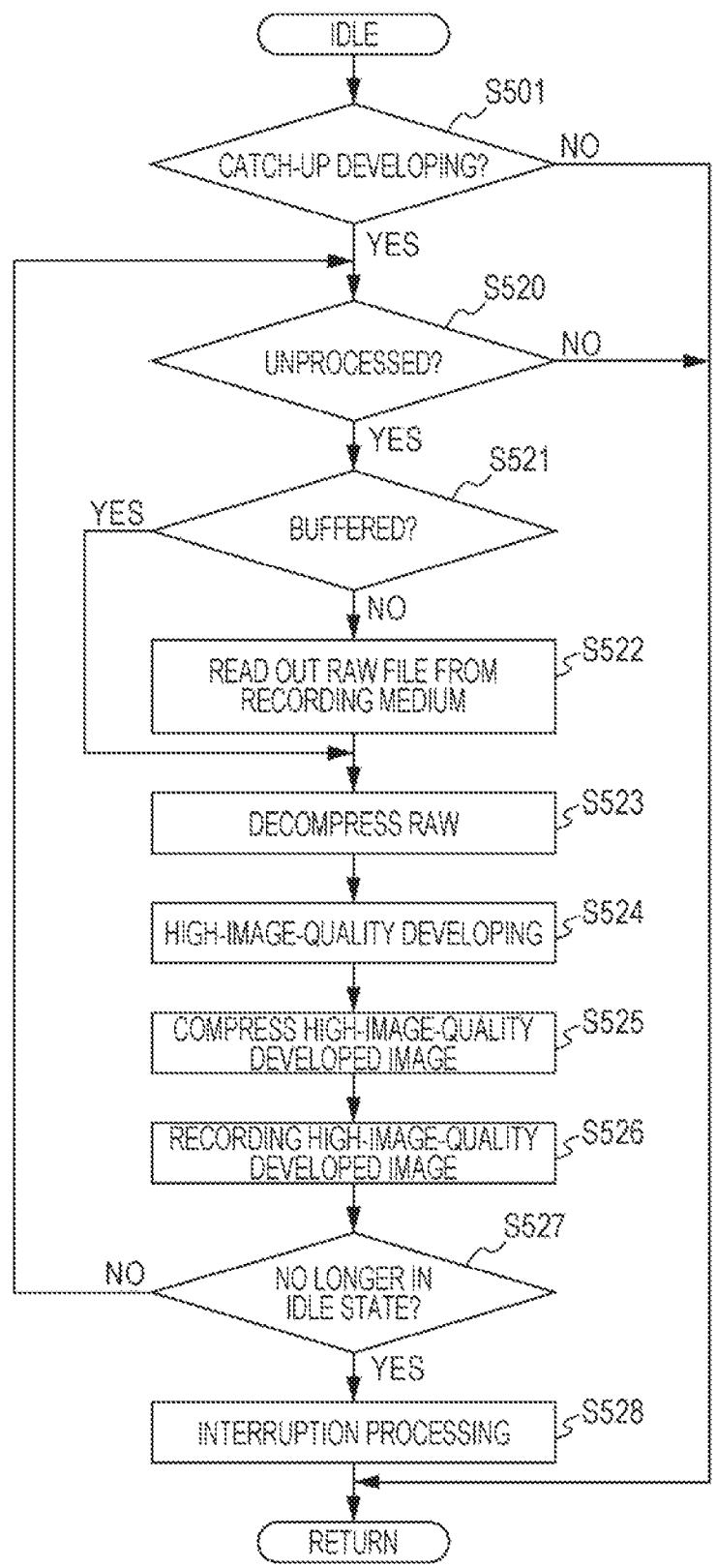

[Fig. 6]
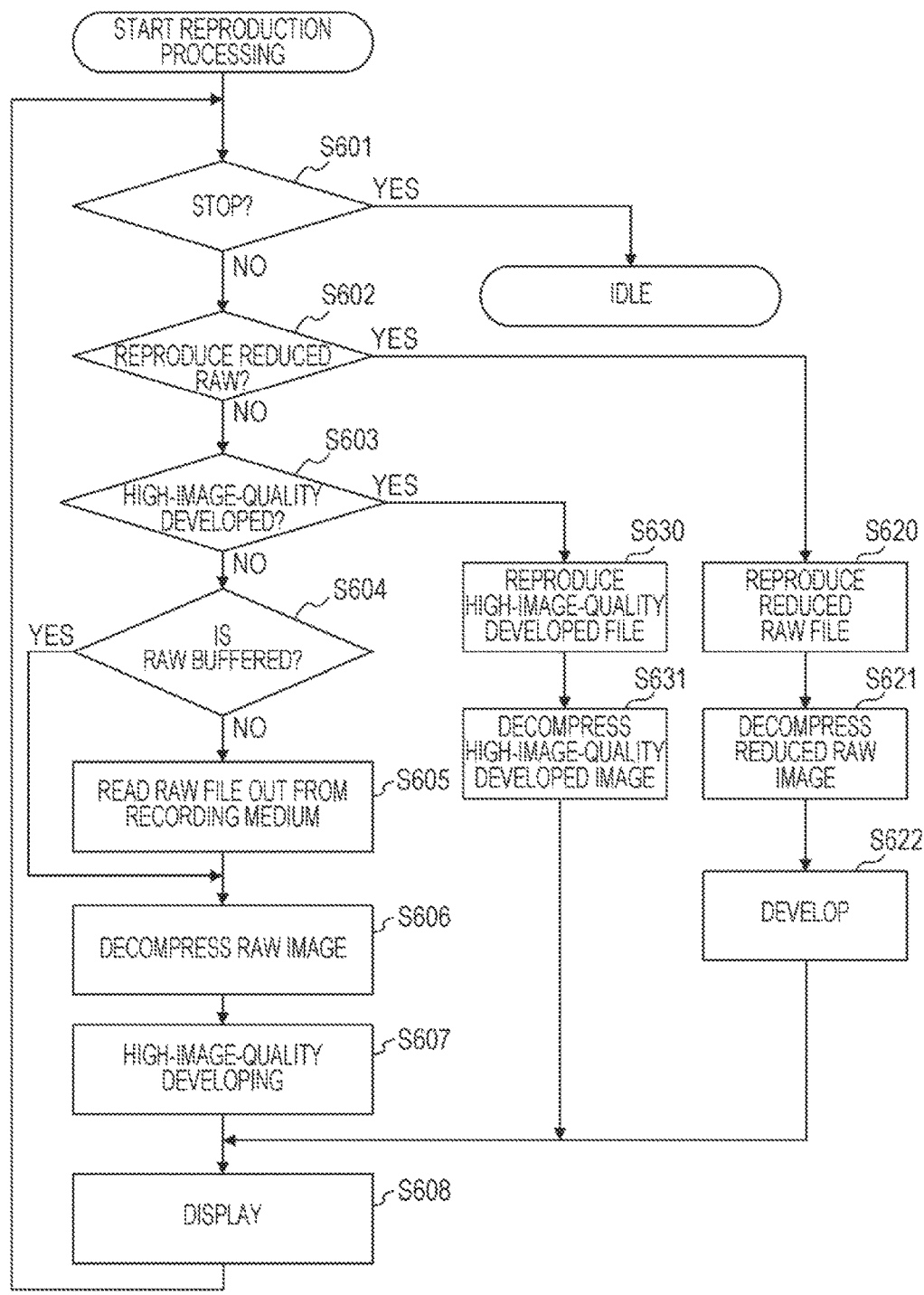

[Fig. 7A]
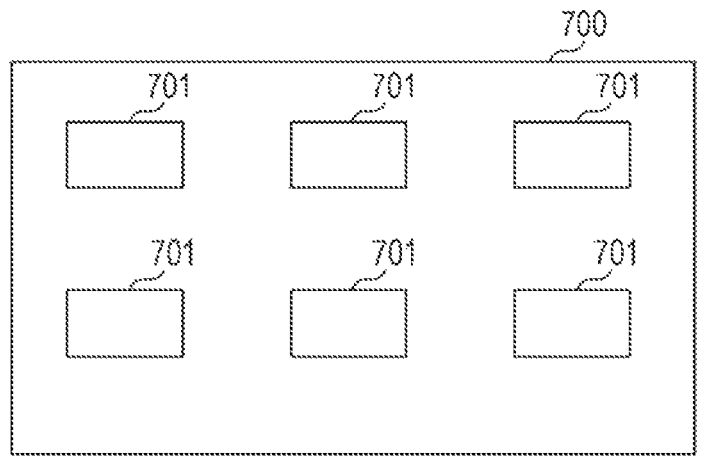
[Fig. 7B]
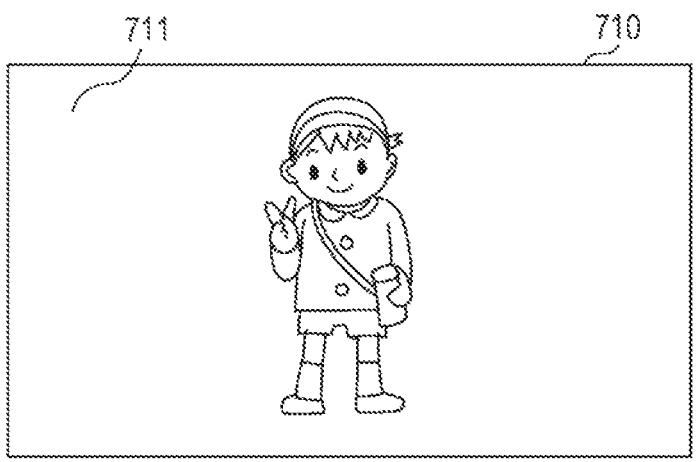
[Fig. 7C]
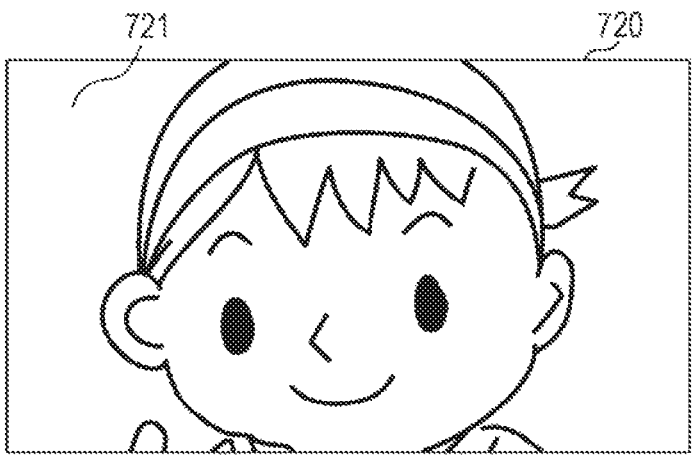

[Fig. 8]
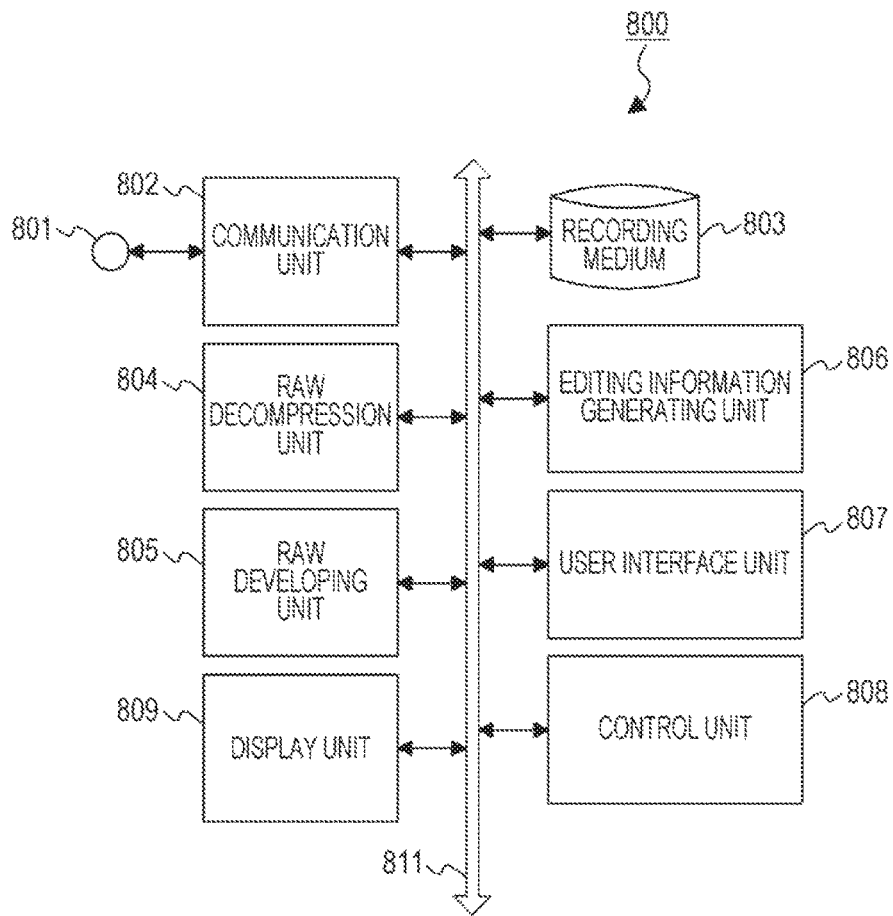
[Fig. 9A]
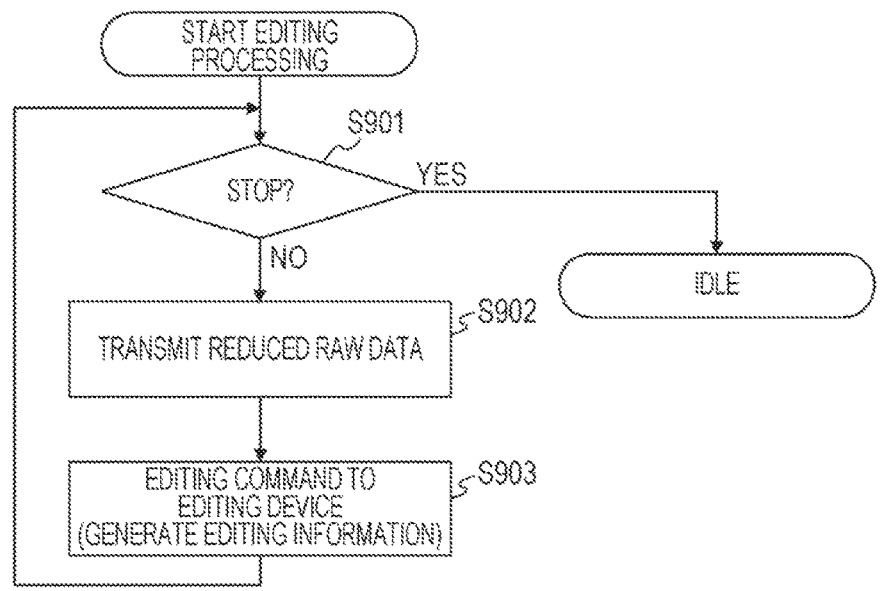

[Fig. 9B]
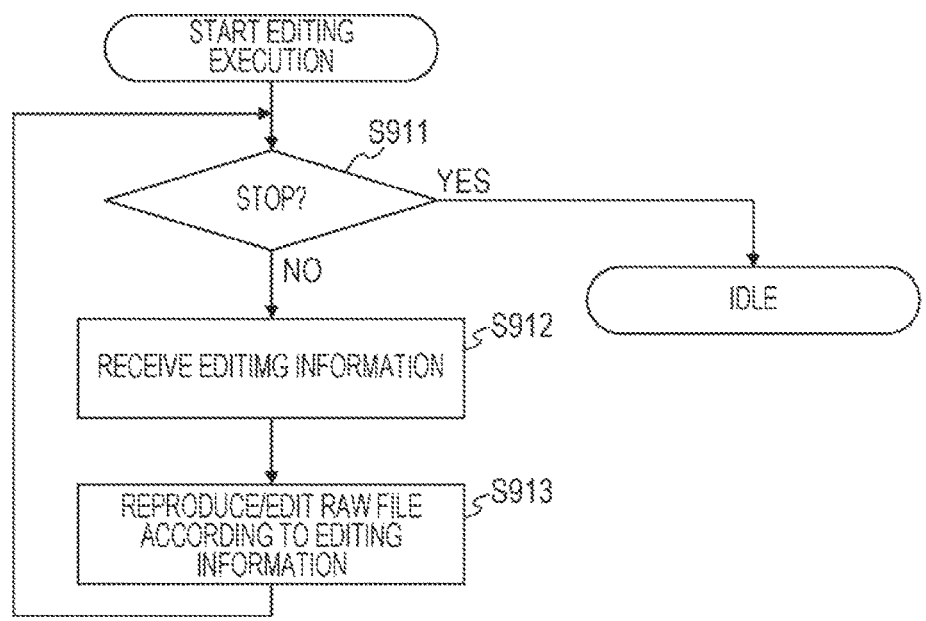

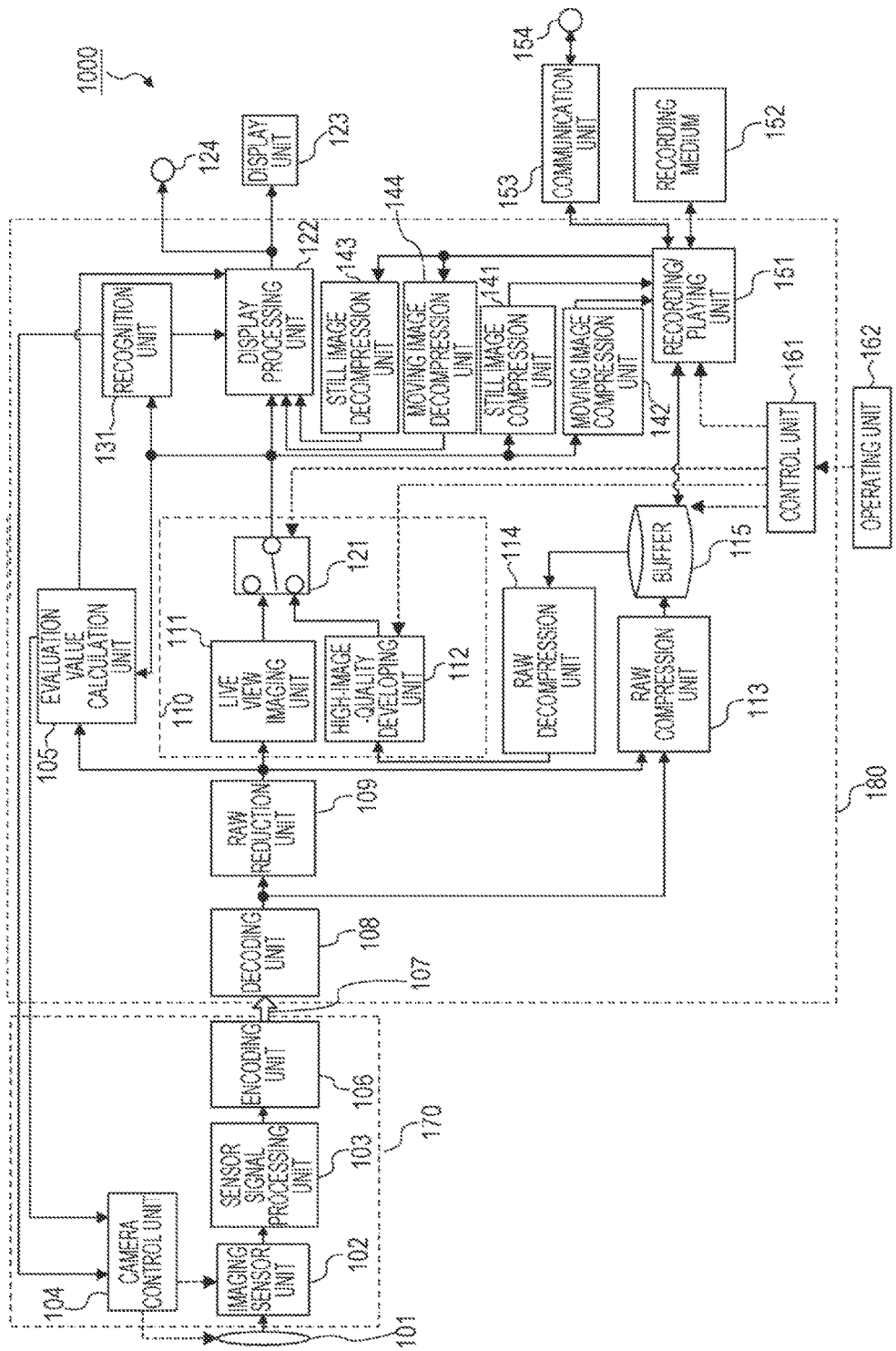
[Fig. 10]

[Fig. 11]
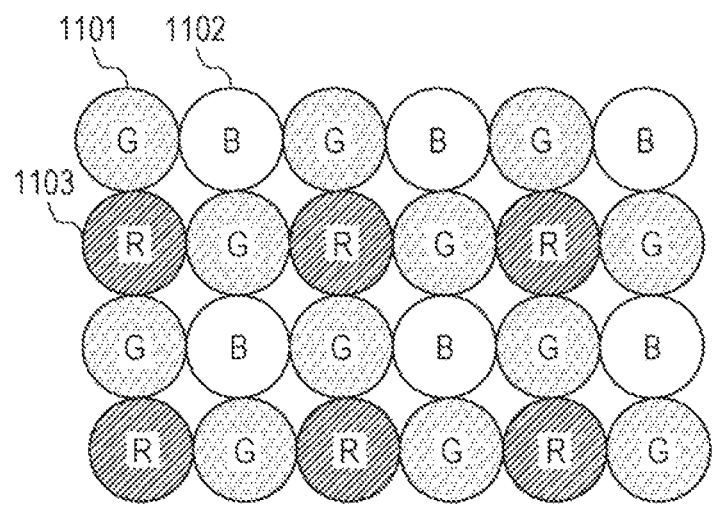

IMAGE PROCESSING APPARATUS AND IMAGE PROCESSING METHOD FOR HANDLING RAW IMAGES

TECHNICAL FIELD

The present invention relates to an image processing apparatus and an image processing method, and more particularly relates to technology of handling RAW images of moving images or still images.

BACKGROUND ART

When performing shooting operations, conventional imaging apparatuses subject raw image information imaged by an imaging sensor (RAW images) to de-Bayering processing (demosaicing processing) so as to convert the raw image information into signals made up of luminance and color difference. The signals are then subjected to developing processing such as noise removal, optical distortion correction, image optimization, and so forth. The imaging apparatus then generally performs compression encoding on the developed luminance signals and color difference signals, and then records in a recording medium.

On the other hand, there are imaging apparatuses capable of recording RAW images. While the amount of data necessary to record RAW image is great, this is preferred by many advanced users. The reason is that advantages there are such as correction and deterioration of the original image being minimal, and that post-shooting editing can be performed.

PTL 1 discloses an imaging apparatus that records RAW images. Disclosed in PTL 1 is a configuration where developing parameters are recorded along with a RAW image, and when reproducing, the RAW image is developed and reproduced using these developing parameters.

As of recent, imaging sensors in imaging apparatuses have advanced to where the number of pixels per image is much greater. Further, the number of images which can be taken by continuous shooting per second is on the rise. This has led to a compounded increase in the amount of processing for each of the processing making up the developing processing, such as de-Bayering processing on RAW images, noise removal, optical distortion correction, and so forth. This has come to necessitate large-scale circuits and increased electric power consumption in the imaging apparatuses, in order to performing real-time developing processing in parallel with shooting. Even then, there may be cases where the imaging apparatus cannot exhibit high-level shooting performance, due to circuits being occupied for developing processing, and constraints related to electric power consumption.

On the other hand, the amount of processing related to developing at the time of shooting might be reduced by a configuration where RAW images are recorded without being developed, such as in PTL 1, but promptly reproducing and displaying the images becomes difficult since the images are recorded in a pre-development state. Further, the fact that RAW images have peculiarities unique to this data format, and that the format may differ from one manufacturer to another, can result in RAW images taken with one device not being able to be reproduced (developed) on another device. Accordingly, conventional RAW image recording formats have in cases been disadvantageous with regard to ease of use by the user.

There has been a problem as described above, that in order for an imaging apparatus to realize high-level shooting performance and also be capable of fast image output of reproduced images, either expensive circuits need to be installed for high-output driving, or the RAW images need to be able to be recorded and reproduced in a fast and convenient manner. Particularly, increased costs are a detriment to the user, so it is important that the imaging apparatus be able to record RAW images in an easy-to-handle manner.

CITATION LIST

Patent Literature

PTL 1: Japanese Patent Laid-Open No. 2011-244423

SUMMARY OF INVENTION

Provided is an image processing apparatus and image processing method enabling an apparatus that records RAW images to suitably perform display when shooting and display when reproducing.

An image processing apparatus according to the present invention includes: an imaging unit configured to use an imaging sensor to acquire a RAW image representing a pre-development image from imaging signals of a subject image; a reduction unit configured to reduce the RAW image to generate a reduced RAW image; a first developing unit configured to acquire the reduced RAW image when shooting, and perform developing processing; a recording unit configured to record each data of the RAW image and the reduced RAW image in a recording medium; an instructing unit configured to instruct reproduction of the RAW image recorded in the recording medium; a second developing unit configured to acquire the reduced RAW image recorded in the recording medium and perform developing processing, in accordance with an instruction for reproduction; and a display processing unit configured to display a reproduction image subjected to developing processing by the second developing unit.

Further features of the present invention will become apparent from the following description of exemplary embodiments with reference to the attached drawings.

BRIEF DESCRIPTION OF DRAWINGS

FIG. 1 is a block diagram illustrating a configuration example of an image processing apparatus according to a first embodiment of the present invention.

FIG. 2 is a state (mode) transition diagram according to the embodiment.

FIG. 3 is a flowchart relating to shooting processing according to the embodiment.

FIG. 4A is a diagram illustrating a configuration example of a file recorded in the embodiment.

FIG. 4B is a diagram illustrating a configuration example of a file recorded in the embodiment.

FIG. 4C is a diagram illustrating a configuration example of a file recorded in the embodiment.

FIG. 5 is a flowchart relating to developing processing according to the embodiment.

FIG. 6 is a flowchart relating to reproducing processing according to the embodiment.

FIG. 7A is a diagram illustrating display processing according to the embodiment.

FIG. 7B is a diagram illustrating display processing according to the embodiment.

FIG. 7C is a diagram illustrating display processing according to the embodiment.

FIG. 8 is a block diagram illustrating a configuration example of an editing apparatus (external apparatus).

FIG. 9A is a flowchart relating to editing processing according to the embodiment.

FIG. 9B is a flowchart relating to execution processing according to embodiment.

FIG. 10 is a block diagram illustrating a configuration example of an image processing apparatus according to a second embodiment of the present invention.

FIG. 11 is an explanatory diagram of a pixel array in a RAW image.

DESCRIPTION OF EMBODIMENTS

First Embodiment

Embodiments of the present invention will be described in detail with reference to the drawings. FIG. 1 is a block diagram illustrating a configuration example of an image processing apparatus according to a first embodiment of the present invention. An imaging apparatus 100 will be exemplarily illustrated as the image processing apparatus according to the present embodiment in FIG. 1. The imaging apparatus 100 not only records image information obtained by imaging a subject in a recording medium, but also has functions of reproducing image information from a recording medium, performing developing processing, and displaying, and functions of exchanging image information with an external apparatus, server (cloud), or the like, and performing editing. Accordingly, the image processing apparatus according to the present embodiment is not restricted to being expressed as being an imaging apparatus, and may also referred to as being a recording apparatus, reproducing apparatus, recording/reproducing apparatus, communication apparatus, editing apparatus, image processing system, editing system, and so forth.

A control unit 161 in FIG. 1 includes a central processing unit (CPU) and memory (omitted from illustration) storing a control program which the CPU executes, thereby controlling the overall processing of the imaging apparatus 100. An operating unit 162 includes input devices such as keys, buttons, a touch panel, and so forth, for the user to give instructions to the imaging apparatus 100. Operation signals from the operating unit 162 are detected by the control unit 161, and the components are controlled by the control unit 161 so that actions are executed corresponding to the operations. A display unit 123 includes a liquid crystal display (LCD) or the like to display images that have been shot or reproduced, menu screens, various types of information, and so forth, on the imaging apparatus 100.

In the present embodiment, the terms "shoot" and "shooting" mean the actions of imaging a subject and displaying the image obtained by the imaging on the display unit 123, and also further recording the image in a predetermined recording medium as a file.

Upon starting of shooting action being instructed by the operating unit 162, an optical image of a subject to be imaged is input via an optical unit 101 including a lens unit, and is imaged on an imaging sensor unit 102. When shooting, the actions of the optical unit 101 and the imaging sensor unit 102 are controlled by a camera control unit 104, based on evaluation value calculation results such as aperture, focus, shaking, and so forth, that are acquired by an evaluation value calculation unit 105, and subject information such as facial recognition results extracted by a recognition unit 131.

The imaging sensor unit 102 converts light (subject image) that has passed through a mosaic color filter of red, green, and blue (RGB) placed at each pixel, into electric signals. The resolution of the imaging sensor is equivalent to, for example, 4K (8 million pixels or more) or 8K (33 million pixels or more). FIG. 11 is a diagram illustrating an example of a color filter disposed at the imaging sensor unit 102, showing a pixel array of an image which the imaging apparatus 100 handles. Red (R), green (G), and blue (B) are arrayed in mosaic fashion at each pixel, with one set of one red pixel, one blue pixel, and two green pixels being orderly arrayed for every four pixels (two pixels by two pixels), as illustrated in FIG. 11. Electric signals converted by the imaging sensor unit 102 have the red (R), green (G), and blue (B) components. Note that green (G) can be handled as two type of green (G0, G1) components at different positions. This sort of pixel array is generally referred to as a Bayer array. The imaging sensor may be a charge-coupled device (CCD) image sensor, complementary metal oxide semiconductor (CMOS) image sensor, or the like. While an RUB color Bayer array has been illustrated, other arrays may also be optionally used for the colors and array for the color filter.

Electric signals converted by the imaging sensor unit 102 are handled as imaging signals of individual pixels. A sensor signal processing unit 103 subjects the pixels included in the imaging signals to restoration processing. This restoration processing involves processing of handling values of missing or unreliable pixels at the imaging sensor unit 102 by performing interpolation using nearby pixel values for such pixels to be restored, and subtracting a predetermined offset value. This may be altered so that part or all of this restoration processing is not performed here but later when developing. In the present embodiment, all images which have not been subjected to substantive developing are handled as RAW images, indicating pre-development images, regardless of whether or not restoration processing has been performed.

That is to say, image information output from the sensor signal processing unit 103 is referred to as RAW image information (hereinafter, "RAW image"), meaning a raw (pre-development) image in the present embodiment. The RAW image is supplied to the RAW compression unit 113 and compressed for efficient recording. The size of the RAW image is also reduced by a RAW reduction unit 109 for efficient display and reproduction. The RAW reduction unit 109 resizes the input RAW images to high-definition (HD) size (equivalent to around 2 million pixels), for example. Hereinafter, a RAW image which has been reduced by the RAW reduction unit 109 will be referred to as a reduced RAW image.

The reduced RAW image is supplied to a live view developing unit 111 within a developing unit 110, and subjected to developing processing to be used for display when shooting (live view). The reduced RAW image is also supplied to a RAW compression unit 113 for use in simple reproduction or as a proxy when editing. The reduced RAW image is recorded after being compressed by the RAW compression unit 113 for efficient recording, in the same way as with a RAW image. Further, the reduced RAW image is also supplied to the evaluation value calculation unit 105.

The developing unit 110 will be described in detail now. The developing unit 110 has the live view developing unit 111 (first developing unit) that performs developing for the live view when shooting, a high-image-quality developing unit 112 (second developing unit) that performs high-quality developing when not shooting, and a switch unit 121 that selects the output thereof. The live view developing unit 111 has the capability to perform real-time developing of the reduced RAW image in parallel with shooting, while the high-image-quality developing unit 112 has the capability to develop the RAW image before reduction, which is a larger image than a reduced RAW image, in high definition in non-real-time. In the present embodiment, live view developing may also be referred to as simple developing or display developing, and high-quality developing may also be referred to as main developing or reproduction developing, performed at a requested timing.

The high-image-quality developing unit 112 performs de-Bayering processing (demosaicing processing) on input RAW images or reduced RAW images, where color interpolation processing is performed to convert into luminance and color difference (or primary color) signals, removes noise included in the signals, corrects optical distortion, and optimizes the image, i.e., performs so-called developing processing. Further, the live view developing unit 111 performs de-Bayering processing (demosaicing processing), i.e., color interpolation processing, on reduced RAW images, to convert into luminance and color difference (or primary color) signals, removes noise included in the signals, corrects optical distortion, and optimizes the image, i.e., performs so-called developing processing.

The high-image-quality developing unit 112 performs each process in higher precision than the live view developing unit 111. Due to the high precision, a higher quality developed image is obtained as compared to the live view developing unit 111, but the processing load is greater. Accordingly, the high-image-quality developing unit 112 according to the present embodiment is of a configuration where the developing processing can be performed when reproducing, or when idle after shooting. The circuit scale and the maximum (peak) electric power consumption can be suppressed by performing high-image-quality developing after shooting or when reproducing, and not while shooting. On the other hand, the live view developing unit 111 is configured such that the amount of processing involved in developing is less than in the high-image-quality developing so that developing processing can be performed at high speed while shooting, although the image quality is lower than that of the high-image-quality developing unit 112. The processing load of the live view developing unit 111 is low, and accordingly real-time developing of each frame can be performed in parallel with shooting actions when performing live view shooting of moving images or still images.

The switch unit 121 is switched by the control unit 161, following control in accordance with operations instructed by the user from the operating unit 162 or an operating mode currently being executed. An arrangement may be made where just the one of the live view developing unit 111 and high-image-quality developing unit 112 that is to output signals performs developing operations in conjunction with the switching of the switch unit 121, while the operations of the other are stopped. Although the live view developing unit 111 and the high-image-quality developing unit 112 are illustrated as being separately-existing configurations in the developing unit 110 according to the present embodiment, a single developing unit may selectively perform live view developing and high-image-quality developing by switching an operation mode.

The image information subjected to developing processing by the developing unit 110 is further subjected to predetermined display processing by a display processing unit 122, and thereafter displayed at a display unit 123. The image information subjected to developing processing can also be output to an external display device connected by a video output terminal 124. The video output terminal 124 includes general-purpose interfaces such as High-Definition Multimedia Interface (HDMI, a registered trademark) and serial digital interface (SDI).

When shooting, image information subjected to live view developing by the developing unit 110 is supplied to the evaluation value calculation unit 105. The evaluation value calculation unit 105 calculates evaluation values from the reduced RAW image or developing-processed image information, such as focus state, exposure state, and so forth. The calculated evaluation values are output to the camera control unit 104. Display information indicating the evaluation results is output to the display processing unit 122. Further, the image information subjected to the live view developing is also supplied to the recognition unit 131. The recognition unit 131 has functions of detecting and recognizing subject information, such as faces, people, and so forth, in the image information. For example, the recognition unit 131 detects whether or not there are faces in the screen of the image information, and if there are faces, outputs information indicating the position of the faces to the camera control unit 104, and further recognizes particular people based on feature information such as faces and so forth. Display information indicating the detection and recognition results is output to the display processing unit 122.

Image information subjected to high-image-quality developing by the developing unit 110 is supplied to a still image compression unit 141 or a moving image compression unit 142. In a case of compressing the image information as a still image, the still image compression unit 141 is used. In a case of compressing the image information as a moving image, the moving image compression unit 142 is used. The still image compression unit 141 and moving image compression unit 142 perform high-efficiency encoding (compression coding) of respective image information thereby generating image information where the amount of information has been compressed, and converts into a high-image-quality-developed file (still image file or moving image file). Examples of standard coding techniques that can be used include JPEG and the like for still image compression, and MPEG-2, H.264, H.265, and the like for moving image compression.

The RAW compression unit 113 performs high-efficiency coding of the RAW image data from the sensor signal processing unit 103 and reduced RAW image data from the RAW reduction unit 109, using technology such as wavelet transform, quantization, entropy coding (differential coding, etc.), and so forth. The RAW compression unit 113 generates a files of RAW images (RAW files) and reduced RAW images (reduced RAW files) which have been compressed by high-efficiency coding. The RAW files and reduced RAW files are first stored in a buffer 115 (storage medium). The RAW files and reduced RAW files may be left in the buffer 115 and called up again, or may be stored in the buffer 115 and then transferred to a separate recording medium and recorded (deleted from the buffer 115), as described later.

The RAW files and reduced RAW files, and the high-image-quality developed files (still image files and moving image files) are recorded in a recording medium 152 by a recording/reproducing unit 151. Examples of the recording medium 152 include a built-in large-capacity semiconductor memory or hard disk, a detachable memory card, or the like. The recording/reproducing unit 151 may also read out various types of files from the recording medium 152 in accordance with user operations.

The recording/reproducing unit 151 can exchange various types of files and related information with an external storage server connected over a network via a communication unit 153, or with a mobile information terminal or personal computer (PC) or the like. The communication unit 153 is configured so as to be able to access external apparatuses over the Internet by wireless communication or cabled communication, or by direct communication between devices using a communication terminal 154. Accordingly, the recording/reproducing unit 151 can record the RAW files and reduced RAW files, and the high-image-quality developed files (still image files and moving image files) in external apparatuses, and give instructions to generate editing information based on the recorded information.

When performing reproducing operations of the imaging apparatus 100, the recording/reproducing unit 151 obtains a desired file from the recording medium 152, or from an external apparatus via the communication unit 153, and reproduces the file. If the file to be reproduced is a RAW file or reduced RAW file, the recording/reproducing unit 151 stores the obtained RAW file in the buffer unit 115. If the file to be reproduced is a still image file, the recording/reproducing unit 151 supplies the obtained file to a still image decompression unit 143. If the file to be reproduced is a moving image file, the recording/reproducing unit 151 supplies the obtained file to a moving image decompression unit 144.

A RAW decompression unit 114 reads out a RAW file or reduced RAW file stored in the buffer 115, performs conversion opposite to that performed during compression, and thus decompresses the compressed file. The RAW image or reduced RAW image decompressed by the RAW decompression unit 114 is supplied to the high-image-quality developing unit 112, and is subjected to the high-image-quality developing processing as described above.

The still image decompression unit 143 decodes and decompresses still image files that have been input, and supplies these to the display processing unit 122 as reproduced images of still images. The moving image decompression unit 144 decodes and decompresses moving image files that have been input, and supplies these to the display processing unit 122 as reproduced images of moving images.

Next, operating modes of the imaging apparatus 100 according to the present embodiment will be describe with reference to the drawings. FIG. 2 is a state (mode) transition diagram according to the present embodiment. Such mode transition is executed in accordance with user operation instructions from the operating unit 162, or by determination by the control unit 161. Accordingly, transition may be performed manually by operations, or transition may take place automatic. As can be seen in FIG. 2, the imaging apparatus 100 operations by switching through an idle state (200) to the five modes of a still image shooting mode (201), a still image reproducing mode (202), a moving image shooting mode (203), a moving image reproducing mode (204), and an editing mode (205), as appropriate.

Next, the operations relating to the still image shooting mode and moving image shooting mode of the imaging apparatus 100 will be described. FIG. 3 illustrates a flowchart relating to shooting processing according to the present embodiment. The flowchart in FIG. 3 illustrates processing procedures executed by the control unit 161 controlling each processing block. These processing procedures are realized by loading a program stored in memory (read only memory (ROM)) of the control unit 161 to random access memory (RAM), and the CPU executing the program.

Upon shooting processing of a still image or moving image starting in FIG. 3, in S301 the control unit 161 determines whether or not to stop shooting. If determination is made to stop the shooting processing, transition is made to the idle state, otherwise, the flow advances to S302. An arrangement may be made where the state transitions to the idle state even in the shooting mode, of there is no operating input accepted for a predated amount of time, or there is time till the next shooting.

In S302, the camera control unit 104 controls the operations of the optical unit 101 and imaging sensor unit 102 so that shooting is performed under suitable conditions. For example, lenses included in the optical unit 101 are moved according to zoom or focusing instructions given by the user, a readout region of the imaging sensor unit 102 is set following instructions of the number of shooting pixels, and so forth. Also, control such as focus adjustment and tracking of a particular subject is performed based on evaluation value information and subject information supplied from the later-described evaluation value calculation unit 105 and recognition unit 131. Further, in S302, electric signals obtained by conversion at the imaging sensor unit 102 are subjected to signal processing at the sensor signal processing unit 103 for restoration of pixels. That is to say, the sensor signal processing unit 103 subjects missing or unreliable pixels to interpolation using nearby pixel values for such pixels to be restored, subtracting a predetermined offset value, or the like. In the present embodiment, image information which is output from the sensor signal processing unit 103 after the processing in S302 has ended is called a RAW image, meaning a raw (pre-development) image.

In S303, the RAW reduction unit 109 generates a reduced RAW image from the above-described RAW image. In S304, the live view developing unit 111 performs developing processing (live view developing) of the reduced RAW image. The control unit 161 switches the switch unit 121 within the developing unit 110 to select output of the image information subjected to developing processing by the live view developing unit 111.

The live view developing unit 111 subject the reduced RAW image to de-Bayering processing (demosaicing processing), i.e., color interpolation processing, so as to convert into signals made up of luminance and color difference (or primary colors). The signals are then subjected to developing processing such as noise removal, optical distortion correction, image optimization, and so forth. The live view developing unit 111 realizes high speed of developing and simple processing, by eliminating or restricting the range of the noise removal and optical distortion correction. The developing processing (simple developing) which the live view developing unit 111 performs will be described. Due to the live view developing unit 111 handling reduced RAW images, and restricting part of the developing processing functions, the imaging apparatus 100 can realize shooting with performance such as 60 frames of 2 million pixels per second, for example, using a small circuit scale and low power consumption.

The image information subjected to developing processing at the live view developing unit 111 is supplied to the evaluation value calculation unit 105. In S305, the evaluation value calculation unit 105 computes evaluation values such as focus state, exposure state, and so forth, from the luminance values, contrast values, and so forth, included in the image information. Note that the evaluation value calculation unit 105 may obtain a reduced RAW image before live view developing, and calculate some sort of evaluation value from the reduced RAW image as well.

The image information subjected to developing processing at the live view developing unit 111 is also supplied to the recognition unit 131. In S306, the recognition unit 131 performs detection of a subject (such as a face) from the image information, and recognizes the subject information. For example, the recognition unit 131 detects whether or not there are faces in the screen of the image information, and if there are faces, recognizes position of the faces and particular people, and outputs the results as information.

The image information subjected to developing processing at the live view developing unit 111 is also supplied to the display processing unit 122. In S307, the display processing unit 122 forms a display image from the acquired image information, and outputs to the display unit 123 or an external display device for display. A display image on the display unit 123 is used as a live view display for aiding the user in suitably framing the subject, i.e., a live view image for shooting. Note that the display image from the display processing unit 122 may be displayed on another external display device such as a television or the like, via the video output terminal 124. Further, the display processing unit 122 may use the evaluation value information and subject information output from the evaluation value calculation unit 105 and recognition unit 131 to mark a focused region on the displayed image, displaying a frame at the position where a face has been recognized, and so forth, for example.

In S308, the control unit 161 determines whether or not there has been a shooting instruction from the user (a recording instruction in the case of a moving image), and if there has been such an instruction, the flow advances to S310. If there is no instruction in S308, the flow returns to S301, and repeats shooting (recording) preparation operations and live view display.

In S310, the RAW compression unit 113 performs high-efficiency coding (reduced RAW compression) on the reduced RAW image corresponding to the image to be shot (in the case of a moving image, multiple consecutive frames) in response to the aforementioned shooting instruction, and generates a reduced RAW file. Further, in S311, in response to the above-described shooting instructions, the RAW compression unit 113 performs high-efficiency coding (RAW compression) on the RAW image corresponding to the image to be shot (in the case of a moving image, multiple consecutive frames), and generates a RAW file. The high-efficiency coding which the RAW compression unit 113 performs here is according to known technology such as wavelet transform, entropy encoding, and so forth, but may be lossy coding or lossless coding. In the present embodiment, a RAW file is generated which can be restored as a high-image-quality file where the quality is the original RAW image is not markedly lost even if the RAW is compressed.

In S312, the reduced RAW file is recorded in the buffer 115. Further, in S313, the RAW file is recorded in the buffer 115. In the case of either file, once the file is recorded in the buffer 115, the timing of recording in a recording medium downstream by the recording/reproducing unit 151 may be either at that point or later. Once the reduced RAW file and the RAW file are recorded to at least the buffer 115, the flow returns to S301.

Accordingly, the imaging apparatus 100 according to the present embodiment generates RAW files in response to shooting instructions of still images or moving images (recording instructions) at the time of shooting. Otherwise when shooting, a shooting standby state is effected where an image obtained by live view developing is displayed. A RAW file is a high-image-quality file so that the image information supplied from the sensor signal processing unit 103 is not markedly lost, but developing processing is not needed to generate this file. Accordingly, RAW files can be recorded when shooting with a greater number of image pixels and faster consecutive shooting speed, using a small-scale circuit with low electric power consumption.

Next, the structure of various types of files according to the present embodiment will be described, FIGS. 4A through 4C illustrate configuration examples of files recorded in the present embodiment, with FIG. 4A illustrating a reduced RAW file, FIG. 4B a RAW file, and FIG. 4C a high-image-quality developed file.

The reduced RAW file 400 illustrated in FIG. 4A is recorded in a predetermined recording area of the recording medium 152, for example, by the recording/reproducing unit 151. The reduced RAW file 400 includes a header portion 401, a metadata portion 402, and a compressed data portion 403. The header portion 401 contains identification code indicating that this file is of a reduced RAW file format, and so forth. The compressed data portion 403 contains compressed data of a reduced RAW image that has been subjected to high-efficiency coding. In a case of a reduced RAW file of a moving image, compressed audio data is also included.

The metadata portion 402 includes identification information 404 such as file name of corresponding RAW file, and so forth, generated at the same time as this reduced RAW file. In a case where there is a high-image-quality developed file obtained by the corresponding RAW file having been subjected to high-image-quality developing, this identification information 407 is stored. Also, if this reduced RAW image has already been developed, information 405 of the developing status thereof is included. Further, shooting metadata 406 including evaluation values and subject information calculated and detected at the evaluation value calculation unit 105 and recognition unit 131 at the time of shooting, and information from the optical unit 101 and imaging sensor unit 102 at the time of shooting (e.g., lens type identification information, sensor type identification information, etc.), is included. Although omitted from illustration, identification code of a recording medium where a RAW file generated at the same time is recorded, path information of a folder where recorded, a thumbnail of the image, and so forth, may further be included.

The RAW file 410 illustrated in FIG. 4B is recorded in a predetermined recording area of the recording medium 152, for example, by the recording/reproducing unit 151. The RAW file 410 includes a header portion 411, a metadata portion 412, and a compressed data portion 413. The header portion 411 contains identification code indicating that this file is of a RAW file format, and so forth. The compressed data portion 413 contains compressed data of a RAW image that has been subjected to high-efficiency coding. In a case of a RAW file of a moving image, compressed audio data is also included.

The metadata portion 412 includes identification information 414 such as file name of corresponding reduced RAW file, and so forth, generated at the same time as this RAW file. In a case where there is a high-image-quality developed file obtained by this RAW image having been subjected to high-image-quality developing, this identification information 417 is stored. Also, information 415 of the developing status thereof in the high-image-quality developing is included. Further, shooting metadata 416 including evaluation values and subject information calculated and detected at the evaluation value calculation unit 105 and recognition unit 131 at the time of shooting, and information from the optical unit 101 and imaging sensor unit 102 at the time of shooting (e.g., lens type identification information, sensor type identification information, etc.), is included. Although omitted from illustration, identification code of a recording medium where a reduced RAW file generated at the same time is recorded, path information of a folder where recorded, a thumbnail of the image, and so forth, may further be included. Alternatively, the actual data of the reduced RAW file generated at the same time as this RAW file itself may be made into metadata and sorted in the metadata portion 412. Further, the actual data of high-image-quality developed file corresponding to this RAW file may itself be made into metadata and stored in the metadata portion 412.

The high-image-quality developed file 420 illustrated in FIG. 4C is recorded in a predetermined recording area of the recording medium 152, for example, by the recording/reproducing unit 151. The high-image-quality developed file 420 includes a header portion 421, a metadata portion 422, and a compressed data portion 423. The header portion 421 contains identification code indicating that this file is of a high-image-quality developed file format, and so forth. The compressed data portion 423 contains compressed data of still image portions and moving image portions of a high-image-quality developed file. In a case of a moving image, compressed audio data is also included.

The metadata portion 422 includes identification information 424 such as the file name of a reduced RAW file corresponding to this high-image-quality developed file, and so forth. Also, identification information 427 of the file name of a RAW file corresponding to the high-image-quality developed file is included. Also, information 425 of the developing status of this high-image-quality developed file in the high-image-quality developing is included. Further, shooting metadata 426 including evaluation values and subject information calculated and detected at the evaluation value calculation unit 105 and recognition unit 131 at the time of shooting, and information from the optical unit 101 and imaging sensor unit 102 at the time of shooting (e.g., lens type identification information, sensor type identification information, etc.), is included. Although omitted from illustration, identification code of a recording medium where the corresponding RAW file and reduced RAW file is recorded, path information of a folder where recorded, a thumbnail of the image, and so forth, may further be included.

The above-described file structures according to the present embodiment are only exemplary, and may have structures in common with standards such as Design rule for Camera File system (DCF), Exchangeable Image File format (EXIF), Advanced Video Codec High Definition (AVCHD), or Material eXchange Format (MXF).

An example of high-image-quality developing processing of the imaging apparatus 100 will be described. FIG. 5 is a flowchart relating to developing processing according to the present embodiment. The flowchart in FIG. 5 illustrates the processing procedures which the control unit 161 carries out by controlling the processing blocks, and is realized by loading a program stored in memory (ROM) of the control unit 161 to memory (RAM), and the CPU executing the program.

In FIG. 5, the control unit 161 determines whether or not to perform "catch-up developing" according to user settings when in an idle state (S501), and if determination is made not to perform catch-up developing, the flow ends (returns). If determination is made to perform catch-up developing, the flow advances to S520.

The "catch-up developing" according to the present embodiment means that after the shooting operation has ended, a RAW file recorded in the buffer 115 or recording medium 152 is read out, and the RAW image is subjected to high-image-quality developing, thereby generating a high-image-quality developed file. This catch-up developing is developing processing performed when the device is idle or in the background of other processing. The name comes from developing processing seeming to chase a RAW file recorded earlier, as if it were trying to catch up. While both still images and moving images may be included in RAW files which are the object of catch-up developing according to the present embodiment, an example of still images will be described below.

As described above, a recorded RAW file is a high-image-quality file where the image information supplied from the sensor signal processing unit 103 is not markedly lost, but reproduction display or printing cannot be performed immediately since the RAW file is data before developing, and a request for reproduction display or printing necessities time for RAW developing. Also, a RAW file is not a format in widespread use like JPEG or the like, so reproducing environments which can handle RAW files are restricted. Accordingly, the catch-up developing according to the present embodiment is a useful function. Upon catch-up developing being performed in the present embodiment, a RAW file that has already been recorded is read out, subjected to high-image-quality developing processing by the high-image-quality developing unit 112, and the generated high-image-quality developed still image file is recorded in the recording medium 152 or the like. This sort of catch-up developing is performed in states where the processing load of the apparatus is relatively low in standby for user operations (when idle), such as in between shootings, when in standby in reproducing mode, in sleep state, or the like. The catch-up developing may be initiated manually, but preferably is designed so that the control unit 161 automatically executes in the background in a certain state. Due to this configuration, even in a case where there is a request at a later time for reproduction of high-image-quality images, such as displaying to confirm details of an image or printing or the like, there is no delay in the developing processing (reproduction output) each time, and a general operating environment the same as with conventional still image files can be used.

In S520 in FIG. 5, the control unit 161 determines whether the catch-up developing for the RAW file of interest is already processes or unprocessed. Examples of conceivable ways of determining include whether or not a high-image-quality developed file has been created, from identification information in the RAW file 410, or the like. Alternatively, the developing status information 415 in the RAW file 410 may be referenced to make this determination in the same way. Alternatively again, a table file indicating the state of execution of developing processing of a series of RAW files may be prepared separately and used for determination.

If the control unit 161 determines that catch-up developing has been competed for all RAW files of interest, the flow ends (returns) there, and the imaging apparatus 100 transitions to the idle state. If there are any RAW files regarding which the catch-up developing is unprocessed, the flow advances to S521. If a RAW file regarding which catch-up developing is unprocessed has been buffered in the buffer 115 in S521, the flow advances to S523. If not, the RAW file is read out from the recording medium 152 or the like in S522, and temporarily held at the buffer 115.

The data of the buffer 115 is updated so that the images which are newer in the order of shooting are held with higher priority. That is to say, images shot in the past are deleted from the buffer in order. Thus, the most recently shot images are always held in the buffer, so S522 can be skipped and processing performed at high speed. Further, an arrangement where catch-up developing is performed starting from an image shot immediately prior and going back in time enables images held in the buffer to complete processing with higher priority, so the processing is more efficient.

In S523, the RAW decompression unit 114 decompresses the RAW file read out from the buffer 115 or recording medium 152 and buffered, thereby restoring the RAW image. In S524, the high-image-quality developing unit 112 executes high-image-quality developing processing on the restored RAW image, and outputs the high-image-quality developed image to the display processing unit 122 and still image compression unit 141 via the switch unit 121. At this time, a display image may be displayed on the display unit 123 if the imaging apparatus 100 is in a state where images developed later can be displayed.

The high-image-quality developing unit 112 performs de-Layering processing (demosaicing processing) on the RAW images, i.e., performs color interpolation processing to convert into signals made up of luminance and color difference (or primary color) signals, removes noise included in the signals, corrects optical distortion, and optimizes the image, i.e., performs so-called developing processing. The size (number of pixels) of the developed image generated at the high-image-quality developing unit 112 is the full-size read out from the imaging sensor unit 102, or a size set by the user, so the image quality is much higher than the live view developing image that handles around 2 million pixels. The high-image-quality developing unit 112 performs each process in higher precision than the live view developing unit 111, so a higher quality developed image is obtained as compared to the live view developing unit 111, but the processing load is greater. The high-image-quality developing unit 112 according to the present embodiment has a configuration with increase in circuit scale and electric power consumption suppressed, by avoiding real-time developing processing in parallel with shooting, and enabling developing to be performed taking time.

The image information subjected to developing processing at the high-image-quality developing unit 112 is supplied to the still image compression unit 141 or the moving image compression unit 142. In the case of a still image, the still image compression unit 141 handles compression. In S525, the still image compression unit 141 performs high-efficiency coding processing (still image compression) on the acquired high-image-quality developed image, thus generating a high-image-quality developed file (still image file). Note that the still image compression unit 141 performs compression processing by a known format such as JPEG or the like. In S526, the recording/reproducing unit 151 records the high-image-quality developed file in the recording medium 152 or the like.

If the control unit 161 determines in S527 that the imaging apparatus 100 is no longer in the idle state, partway through the flow, transition is made to interruption processing. Otherwise, the flow returns to S520. In the processing of S520 and thereafter, if there is a RAW image regarding which catch-up developing is unprocessed, the same processing can be repeatedly executed for each image. On the other hand, in a case of interrupting the catch-up processing in S528, information at the point of the control unit 161 interrupting (RAW file to be interrupted, identification information regarding whether developing completed or not completed, etc.) is stored in memory or the recording medium 152 as recovery information (interruption processing). At the time of performing catch-up developing, the control unit 161 references this recovery information so as to resume from the RAW file that was interrupted. After the interruption processing ends, the imaging apparatus 100 returns to the idle state.

The high-image-quality developed file recorded in S526 is of a file structure such as illustrated in FIG. 4C. The information such as the file name of the original RAW file for this high-image-quality developed file is written to the metadata portion 422. Information 425 is also described regarding the fact that this high-image-quality developed file has been subjected to high-image-quality developing by the high-image-quality developing unit 112, and the developing status indicating the content of this developing. Shooting metadata 426 including evaluation values and subject information calculated and detected by the evaluation value calculation unit 105 and recognition unit 131, and information at the time of shooting from the optical unit 101 and imaging sensor unit 102, extracted from the metadata of the original RAW file, is also copied. Further, the recording/reproducing unit 151 updates information for each metadata portion of the original RAW file for the catch-up developing, and the reduced RAW file thereof as well, to the newest information relating to the generated high-image-quality developed file.

An arrangement where the recording/reproducing unit 151 records the new high-image-quality developed file recorded in S526 after the high-image-quality developing, using a file name similar or correlated with the original RAW file, facilitates identification. For example, a file name where only part of the file name has been changed (e.g., suffix or ending characters) while the rest of the file name is the same, is desirable.

Thus, the imaging apparatus 100 according to the present embodiment executes catch-up developing in states where the processing load of the apparatus is relatively low in standby for user operations (when idle), such as in between shootings, when in standby in reproducing mode, in sleep state, or the like. High-image-quality developed files are sequentially created from the RAW files. Thus, even when receiving a request for reproduction of a high-image-quality image, such as for confirmation display of detailed portions of the image or for printing, there is no delay due to developing processing (reproduction output) each time this occurs, and the files can be used in a general operating environment in the same way as conventional still image files.

Next, operations relating to the still image reproducing mode and moving image reproducing mode of the imaging apparatus 100 will be described. FIG. 6 is a flowchart relating to reproducing processing of the present embodiment. The flowchart in FIG. 6 illustrates the processing procedures which the control unit 161 carries out by controlling the processing blocks, and is realized by loading a program stored in memory (ROM) of the control unit 161 to memory (RAM), and the CPU executing the program.

In S601 in FIG. 6, the control unit 161 determines whether or not to stop reproduction processing. In a case of stopping reproduction processing, the imaging apparatus 100 returns to the idle state. Otherwise, the flow advances to S602.

In S602, the control unit 161 reads out a reduced RAW image file which is the object of reproduction processing, and determines whether or not to reproduce the reduced RAW image. RAW files are high-resolution, and accordingly take time to develop as described above. Further, there is a possibility that a high-image-quality developed file has not net been generated, so when reproducing, the control unit 161 reproduces RAW images with higher priority than others. A reduced RAW image has around 2 million pixels, so high-speed processing can be performed in live view developing in the same way, sudden requests for reproducing can be immediately handled, and a reproduced image can be quickly output in quick response. Note however, that a reduced RAW image has limited image quality. While this is effective for general confirmation of the image, it may be insufficient for usages such as confirming details of the image or printing. Accordingly, The imaging apparatus 100 also executes reproduction processing of other images depending on usage, as described below.

In a case of reproducing a reduced RAW image, in S620 the control unit 161 reproduces the reduced RAW file to be reproduced, from the buffer 115 or recording medium 152 or the like. In S621, the RAW decompression unit 114 decompresses the compressed reduced RAW image obtained from the reproduced reduced RAW file. Further, in S622 the high-image-quality developing unit 112 develops the decompressed reduced RAW image to generate a reproduction image, which is supplied to the display processing unit 122. While developing of the reduced. RAW image has been described as being performed by the high-image-quality developing unit 112 in S622, this may be performed by the live view developing unit 111 instead.

In a case of not reproducing the reduced RAW image, in S603 the control unit 161 determines whether or not to reproduce a high-image-quality developed image. A condition for reproducing a high-image-quality developed image is that the above-described catch-up developing has been performed, or that high-image-quality developing has already been completed by reproduction of the RAW file in response to a user request. In a case of reproducing a high-image-quality developed image, in S630 the control unit 161 reproduces the high-image-quality developed file to be reproduced from the recording medium 152 or the like. In S631, the still image decompression unit 143 or the moving image decompression unit 144 decompresses the compressed high-image-quality developed image obtained from the reproduced high-image-quality developed file to generate a reproduction image (still image or moving image), which is supplied to the display processing unit 122.

In a case where no reduced RAW file is reproduced and no high-image-quality developed image is reproduced, the RAW file is reproduced. Examples of usage environments of reproduction of a RAW file in the present embodiment will be described with reference to FIGS. 7A, 7B, and 7C. FIGS. 7A, 7B, and 7C are diagrams illustrating examples of display processing of the present embodiment. FIGS. 7A, 7B, and 7C are examples of image displays at different timings.

Display example 700 in FIG. 7A is an example of reduced display of six images, denoted by reference numeral 701, on the display unit 123 in a reduced manner. This display state is a list display. Display example 710 in FIG. 7B is an example of display of one image 711 on the entire display unit 123. This display state is a normal display. Display example 720 in FIG. 7C is an example of display of an enlarged portion of one image 721 on the entire display unit 123. This display state is an enlarged display. The enlarged display assumes usage where part of a subject image is displayed in an enlarged manner such as in the display example 720, to confirm details of an image that has been shot, partially extract (trimming), or check whether in focus or not, for example.

Resolution is sufficient for display of the reproduced image obtained from the reduced RAW image in the state of display examples 700 or 710. However, resolution of a reduced. RAW image is insufficient in a case of enlarged display such as in display example 720 (leads to poor resolution), so a RAW file that has high resolution is prefer reproduced and displayed. In a case of performing enlarged display of the reproduced image, the flow transitions to RAW file reproduction in S604 and thereafter.

In a case of reproducing a RAW image, in S604 the control unit 161 determines whether or not the RAW file to be reproduced has been buffered in the buffer 115. In a case where the RAW file has been buffered, the flow advances to S606, and if not buffered, to S605. In S605, the control unit 161 reads out the RAW file to be reproduced from the recording medium 152 or the like, and buffers in the buffer 115.

The data of the buffer 115 is updated so that the images which are newer in the order of shooting in the shooting mode are held with higher priority. That is to say, images shot in the past are deleted from the buffer in order. Thus, the most recently shot images are always held in the buffer, so S605 can be skipped and processing performed at high speed.

In S606, the RAW decompression unit 114 obtains the buffered RAW file, and decompresses the compressed RAW image obtained from this RAW file. Further, in S607 the high-image-quality developing unit 112 performs high-image-quality developing of the decompressed RAW image to generate a reproduction image, which is supplied to the display processing unit 122. Note that the imaging apparatus 100 can also newly create a high-image-quality developed file corresponding to the RAW file to be reproduced by the high-image-quality developing in S607.

In S608, the display processing unit 122 outputs one of the reproduction images according to the object of reproduction to the display unit 123 for display. The display form is as illustrated in FIGS. 7A through 7C. The display processing unit 122 can also output the display image from the video output terminal 124 to an external apparatus. Upon the displaying in S608 ending, the flow returns to S601.

It can be assumed that the RAW file reproduction from S604 and thereafter in FIG. 6 may occur at a timing where catch-up developing has not the been performed. This conversely means that even in a case of enlarged display that requires high image quality, the high-image-quality developed image can be provided without newly developing the RAW file as long as the high-image-quality developed file has been created. Catch-up developing is performed in the present embodiment in states where the processing load of the apparatus is relatively low in standby for user operations (when idle), such as in between shootings, when in standby in reproducing mode, in sleep state, or the like. Also, a high-image-quality developed image can be created when reproducing a RAW file under user instructions. high-image-quality developed files are sequentially created from RAW files in this way. The more high-image-quality developing is performed beforehand, the lower the frequency of high-image-quality developing occurring at the point of requesting an enlarged display, so the faster high-image-quality images can be output for enlarged displays, and the better the operability is anticipated to be.

Description has been made above that, in a case where the RAW file is buffered in the buffer 115, S605 can be skipped, so the image can be displayed faster. Accordingly, when performing display of the display examples 700 and 710 in FIGS. 7A and 7B, the RAW files corresponding to the images 701 and 711 are prefer read out from the recording medium beforehand and loaded to the buffer 115 beforehand, so that RAW files are held in the buffer 115 as much as possible. An arrangement where the recording/reproducing, unit 151 reads out the corresponding RAW file from the recording medium 152 or the like and buffers before an instruction to enlarge enables display to be made at an even faster response speed when an instruction for an enlarged display such as in the display example 720 is made.

Next, operations relating to the editing mode of the imaging apparatus 100 will be described. FIG. 8 is a block diagram illustrating a configuration example of an editing apparatus (external apparatus) that performs editing processing. FIGS. 9A and 9B are flowcharts relating to editing processing and editing execution of the present embodiment. The flowcharts in FIGS. 9A and 9B illustrate the processing procedures which the control unit 161 carries out by controlling the processing blocks, and is realized by loading a program stored in memory (ROM) of the control unit 161 to memory (RAM), and the CPU executing the program.

An editing apparatus 800 in FIG. 8 is an external apparatus from the imaging apparatus 100, more specifically, an external storage or server, or a mobile information terminal (tablet, smartphone, etc.), personal computer (PC), or the like. The editing apparatus 800 can exchange various types of files and related information with the imaging apparatus 100. A communication unit 802 has a configuration which enables it to access the imaging apparatus 100 via the Internet or by direct communication between apparatuses, by wireless or cabled communication using a communication terminal 801.

At the time of performing editing processing or beforehand, the editing apparatus 800 acquires a reduced RAW file from the external imaging apparatus 100 that is connected over a network via the communication unit 802. The received reduced RAW file is saved in a recording medium 803 via an internal bus 811. The internal bus 811 is connected with the parts within the editing apparatus 800, and serves as a data bus and system bus.

The reduced RAW file is decompressed developed, and image information obtained thereby is used in the editing processing. A RAW decompression unit 804 reads out a desired reduced RAW file saved in the recording medium 803, and decompresses the compressed reduced RAW image. A RAW developing unit 805 performs developing processing of the decompressed reduced RAW image. The image obtained by the developing processing from the reduced RAW image is displayed on a display unit 809.

A control unit 808 includes a CPU, and unshown memory storing application programs and control programs which the CPU executes. The control unit 808 controls the editing processing, which is executed accepting editing instructions from a user monitoring an image displayed on the display unit 809, under control of an editing application program executed by the control unit 808. Editing instructions are input from the user by a user interface unit 807. The user interface unit 807 uses an operating unit realized by a touch panel, mouse, keyboard, dedicated or general-purpose console, or the like for example, and an editing application that provides display information.

The displayed reduced RAW image is subjected to trimming, compositing, and so forth, according to editing instructions from the user interface unit 807. If the file is a moving image, instructions that are applied may also include optional scene selection by cut-in/cut-out being specified, effects being applied and so forth. An editing information generating unit 806 generates editing information according to the contents of editing. The editing information is the contents of editing which the image obtained from the reduced RAW image has been subjected to, in the form of data information. The editing information has described therein whether or not editing has been applied to each frame of still images or moving images, and the contents of editing. The editing information may further include actual data of the reduced RAW image which has been subjected to the editing processing. This editing information is recorded in the recording medium 803, and also transmitted to the imaging apparatus 100 in response to requests from the imaging apparatus 100.

Next, the flows of editing processing and editing execution by the imaging apparatus 100 will be described with reference to FIGS. 9A and 9B. FIG. 9A is an editing processing flow, and FIG. 9B is an editing execution flow. Upon editing processing starting, in S901 of FIG. 9A the control unit 161 determines whether or not to stop editing processing, in a case of stopping editing processing, the imaging apparatus 100 returns to the idle state. In a case of continuing editing processing, the flow advances to S902.

In S902, the control unit 161 transmits the reduced RAW file corresponding to the RAW file to be edited, to the editing apparatus 800 which is an external apparatus, as editing data. In S903, the control unit 161 issues an editing command to the editing apparatus 800. The editing command is transmitted to the control unit 808, and serves as an editing information generating instruction to the editing apparatus 800. After S903, the flow returns to S901.

Upon receiving the aforementioned editing command, the editing apparatus 800 performs the editing processing described above, thereby generating editing information. The control unit 161 can start the editing execution flow in FIG. 9B under user instructions, under the condition that generating of the editing information has ended at the editing apparatus 800.

Upon editing execution being started, in S911 in FIG. 9B the control unit 161 determines whether or not to stop editing processing. In a case of stopping editing processing, the imaging apparatus 100 returns to the idle state. In a case of continuing editing execution, the flow advances to S912.

In S912, the control unit 161 receives from the editing apparatus 800 the editing information corresponding to the RAW file to be edited, using the communication unit 153. In S913, the control unit 161 references this editing information to apply editing or reproduction according to the content described in the received editing information as to the RAW file or reduced RAW file within the imaging apparatus 100. That is to say, the contents of editing on the reduced RAW image performed at the editing apparatus 800 are reproduced on the original RAW image or reduced RAW image within the imaging apparatus 100. After S913, the flow returns to S911. The RAW image subjected to editing execution in this way may be saved as a file where the original file has been updated, or the original image and editing information may each be saved separately and the editing information being reflected when reproducing the image, i.e., edited, each time the image is reproduced.

In this way, the reduced RAW image is used as editing data or as a proxy for the RAW image, whereby the process of editing be streamlined and capabilities increased by this configuration of editing using an external apparatus. Moreover, the overall load on the system regarding editing processing can be reduced.

Second Embodiment

FIG. 10 is a block diagram illustrating a configuration example of an image processing apparatus according to a second embodiment of the present invention. FIG. 10 illustrates an imaging apparatus 1000 as the image processing apparatus according to the present embodiment. The imaging apparatus 1000 not only records image information obtained by imaging a subject in a recording medium, but also has functions of reproducing image information from a recording medium, performing developing processing, and displaying, and functions of exchanging image information with an external apparatus, server (cloud), or the like, and performing editing. Accordingly, the image processing apparatus according to the present embodiment is not restricted to being expressed as being an imaging apparatus, and may also referred to as being a recording apparatus, reproducing apparatus, recording/reproducing apparatus, communication apparatus, editing apparatus, image processing system, editing system, and so forth.

Configurations of the imaging apparatus 1000 according to the present embodiment which are the same as those of the imaging apparatus 100 in the first embodiment described above will be denoted with the same reference numerals, and description thereof will be omitted.

In FIG. 10, the imaging apparatus 1000 has an imaging module 170 serving as an imaging unit, and an image processing module 180 serving as an image processing unit, the imaging module 170 and the image processing module 180 being connected by a bus 107. The RAW data and the like obtained by imaging within the imaging module 170 is supplied to the image processing module 180 via the bus 107. The imaging module 170 includes the imaging sensor unit 102, sensor signal processing unit 103, camera control unit 104, and encoding unit 106. The image processing module 180 includes a decoding unit 108, RAW reduction unit 109, developing unit 110, live view developing unit 111, high-image-quality developing unit 112, switch unit 121, RAW compression unit 113, RAW decompression unit 114, and buffer 115. The image processing module 180 further includes the evaluation value calculation unit 105, recognition unit 131, display processing unit 122, still image compression unit 141, moving image compression unit 142, still image decompression unit 143, moving image decompression unit 144, recording/reproducing unit 151, and control unit 161. The imaging apparatus 1000 also has the optical unit 101, display unit 123, video output terminal 124, communication unit 153, communication terminal 154, and built-in or detachable recording medium 152.

Configurations of the imaging apparatus 1000 according to the present embodiment which differ from those of the imaging apparatus 100 according to the first embodiment described above, will be described in detail. The imaging module 170 internally has the encoding unit 106. This exists to compress RAW data, to reduce transmission of the massive RAW data from overwhelming the communication band over the bus 107. Examples of encoding processing (compression processing) which can be applied at the encoding unit 106 include compression by Differential Pulse Code Modulation (DPCM) and Golomb coding. This method reduces the amount of information of pixels in pixel data subjected to DPCM processing by Golomb coding of difference values among the pixel data thereof. Alternatively, compression may be performed where unnecessary high-hand components of the pixel data are deleted using one-dimensional discrete cosine transform (DCT). The rate of compression may be fixed when carrying out either method, or may be designed to be adjustable according to user instructions or the shooting mode.

Pixel data obtained by the imaging sensor unit 102 converting the subject image when shooting is subjected to pixel restoration processing by the sensor signal processing unit 103. This restoration processing involves processing of handling missing or unreliable pixels at the imaging sensor unit 102 by performing interpolation using nearby pixel values for such pixels to be restored, and subtracting a predetermined offset value. This may be altered so that part or all of this restoration processing is not performed here but later when developing.

The encoding unit 106 performs encoding processing of the pixel data supplied from the sensor signal processing unit 103 according to an aforementioned method. The pixel data in the state of having been compressed in the encoding processing is transmitted to the image processing module 180 via the bus 107. The compressed pixel data is decoded by the decoding unit 108 disposed at the input portion of the image processing module 180. The decoding unit 108 subjects inverse transform from the encoding unit 106 upstream, to decode the compressed pixel data.

The pixel data that has been compressed by the encoding unit 106 and further decoded by the decoding unit 108 is referred to as a RAW image, meaning a raw (pre-development) image in the present embodiment. A RAW image that has been subjected to compression can still be handled as a high-quality RAW image, in the same way as in the first embodiment.

Thereafter, the RAW image is supplied to the RAW compression unit 113 and compressed again, for efficient recording. The RAW image is reduced in size by the RAW reduction unit 109 to effectively perform display and reproduction. The RAW reduction unit 109 resizes the input RAW images to HD size (equivalent to around 2 million pixels), for example, thereby generating a reduced RAW image. Processing of the RAW image and reduced RAW image thereafter is the same as in the first embodiment.

Note that the decoding unit 108 and RAW decompression unit 114 in the image processing module 180, which both perform decompression/decoding of compressed RAW images may be realized by a circuit where part or all of the processing circuits of the two are shared or integrated.

The shooting processing, developing processing, reproduction processing, editing processing, and editing executing processing performed at the imaging apparatus 1000 according to the present embodiment, and the configurations of the files created thereby, are the same as in the first embodiment.

Thus according to the present embodiment, the same functions as the first embodiment can be realized, while improving the transmission efficiency of RAW data within the imaging apparatus 1000.

While the first and second embodiments have been described above, the present invention is not restricted to these embodiments, rather, various modifications may be made by circuit arrangements as suitable without departing from the technical idea of the present invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2014-186871, 2014-186872, and 2014-186873, all filed Sep. 12, 2014, which are hereby incorporated by reference herein in their entirety.

The invention claimed is:

1. An image processing apparatus comprising:
at least one processor configured to:
use an imaging sensor to acquire a raw image representing a pre-development image from imaging signals of a subject image;
reduce the raw image to generate a reduced raw image;
acquire the reduced raw image when shooting, and perform developing processing by a first developing unit;
record each data of the raw image and the reduced raw image in a recording medium;
instruct reproduction of the raw image recorded in the recording medium;
acquire the reduced raw image recorded in the recording medium and perform developing processing by a second developing unit, in accordance with an instruction for reproduction; and
display a reproduction image subjected to developing processing by the second developing unit, and
a control unit configured to, in response to the instruction for reproduction, reproduce a developed image of the raw image in a case where the raw image recorded in the recording medium has been developed, and develop the reduced raw image by the second developing unit and display the developed reduced raw image in a case where the raw image recorded in the recording medium has not been developed.

2. The image processing apparatus according to claim 1, wherein the at least one processor is further configured to perform display developing where an image that has been shot is subjected to developing processing in real time, and
wherein the at least one processor is further configured to perform reproduction developing which is of higher quality than of the first developing unit, to reproduce the recorded image.

3. The image processing apparatus according to claim 1, wherein the at least one processor is further configured to acquire the raw image recorded in the recording medium and perform developing processing, in accordance with predetermined conditions, and
wherein the at least one processor is further configured to generates a high-image-quality developed image file from the developed image of the raw image generated, and records the generated high-image-quality developed image file in the recording medium.

4. The image processing apparatus according to claim 1, further comprising:
an encoding unit configured to perform encoding to compress an amount of information regarding data of pixels in the imaging signals;
a transmission unit configured to transmit encoded pixel data via a bus;
a decoding unit configured to receive and decode the transmitted pixel data; and
a decompression unit configured to restore the raw image from the decoded pixel data, and a compression unit configured to perform raw image compression.

5. An image processing method comprising:
imaging, using an imaging sensor, to acquire a raw image representing a pre-development image from imaging signals of a subject image;
reducing the raw image to generate a reduced raw image;
first developing to acquire the reduced raw image when shooting, and perform developing processing;
recording each data of the raw image and the reduced raw image in a recording medium;
instructing reproduction of the raw image recorded in the recording medium;
second developing to acquire the reduced raw image recorded in the recording medium and perform developing processing, in accordance with an instruction for reproduction; and
displaying a reproduction image subjected to developing processing in the second developing, and
in response to the instructing reproduction, reproducing a developed image of the raw image in a case where the raw image recorded in the recording medium has been developed, and developing the reduced raw image by the second developing and displaying the developed reduced raw image in a case where the raw image recorded in the recording medium has not been developed.

6. A non-transitory computer-readable storage medium storing a program for causing a computer to function each process of the at least one processor of the image processing apparatus according to claim 1.

7. An image processing apparatus comprising at least one processor configured to:
use an imaging sensor to acquire a raw image representing a pre-development image from imaging signals of a subject image;
reduce the raw image to generate a reduced raw image;
compress each of the raw image and the reduced raw image;
record each data of the compressed raw image and the compressed reduced raw image in a recording medium;
read out the compressed raw image recorded in the recording medium in a predetermined state, perform developing processing in the background, and generate a developed image, all performed by a developing unit; and at the time of reproducing of a certain raw image being instructed, perform reproduction output of the developed image in a case where developing processing by the developing unit has ended, and read out the compressed reduced raw image from the recording medium and perform developing processing by the developing unit when reproducing and perform reproduction output in a case where developing processing by the developing unit has not ended.

8. The image processing apparatus according to claim 7, wherein the developing unit reads out the compressed raw image from the recording medium when in an idle state, and performs developing processing.

9. The image processing apparatus according to claim 7, wherein the at least one processor is further configured to read out the raw image from the recording medium in between shootings or reproductions, and performs developing processing.

10. The image processing apparatus according to claim 7, wherein the at least one processor is further configured to generate an image file from a developed image generated by the at least one processor, and records the image file in the recording medium.

11. The image processing apparatus according to claim 7, further comprising:
an encoding unit configured to perform encoding to compress the amount of information regarding data of pixels in the imaging signals;
a transmission unit configured to transmit the encoded pixel data via a bus; and
a decoding unit configured to receive and decode the transmitted pixel data,
wherein a compression unit acquires the raw image from the decoded pixel data, and performs raw image compression.

12. An image processing method comprising:
imaging, using an imaging sensor, to acquire a raw image representing a pre-development image from imaging signals of a subject image;
reducing the raw image to generate a reduced raw image;
compressing each of the raw image and the reduced raw image;
recording each data of the compressed raw image and the compressed reduced raw image in a recording medium;
developing to read out the compressed raw image recorded in the recording medium in a predetermined state, perform developing processing in the background, and generate a developed image; and
reproducing to, at the time of reproducing of a certain raw image being instructed, perform reproduction output of the developed image in a case where developing processing has ended, and read out the compressed reduced raw image from the recording medium and perform developing processing by the a developing unit when reproducing and perform reproduction output in a case where developing processing has not ended.

13. A non-transitory computer-readable storage medium storing a program for causing a computer to function each process of the at least one processor of the image processing apparatus according to claim 7.

* * * * *